(12) United States Patent
Kim et al.

(10) Patent No.: US 9,688,146 B2
(45) Date of Patent: Jun. 27, 2017

(54) VEHICLE INCLUDING DISPLAY APPARATUS

(71) Applicant: HYUNDAI MOTOR COMPANY, Seoul (KR)

(72) Inventors: Dong Uk Kim, Incheon (KR); Hyun Jin Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/958,350

(22) Filed: Dec. 3, 2015

(65) Prior Publication Data
US 2016/0193923 A1    Jul. 7, 2016

(30) Foreign Application Priority Data

Jan. 2, 2015    (KR) ........................ 10-2015-0000191

(51) Int. Cl.
| | |
|---|---|
| *B60K 37/02* | (2006.01) |
| *B60K 35/00* | (2006.01) |
| *B60K 37/04* | (2006.01) |
| *B60R 11/02* | (2006.01) |
| *G09G 5/14* | (2006.01) |
| *B60R 11/00* | (2006.01) |

(52) U.S. Cl.
CPC .............. *B60K 37/02* (2013.01); *B60K 35/00* (2013.01); *B60K 37/04* (2013.01); *B60R 11/0235* (2013.01); *G09G 5/14* (2013.01); *B60K 2350/106* (2013.01); *B60K 2350/1076* (2013.01); *B60K 2350/405* (2013.01); *B60K 2350/901* (2013.01); *B60K 2350/925* (2013.01); *B60R 2011/0005* (2013.01); *B60R 2011/008* (2013.01); *G09G 2380/10* (2013.01)

(58) Field of Classification Search
CPC ....................................................... B60K 37/02
USPC ........................................................... 296/70
See application file for complete search history.

(56) References Cited

U.S. PATENT DOCUMENTS

| | | | |
|---|---|---|---|
| 8,025,327 B1* | 9/2011 | Schowalter | ............ B60K 37/00 296/152 |
| 2005/0127252 A1* | 6/2005 | Fischer | ............... B60R 11/0211 248/176.1 |
| 2013/0242403 A1* | 9/2013 | Hopf | .................. G02B 27/0149 359/630 |
| 2014/0320382 A1 | 10/2014 | Moussa et al. | |

(Continued)

FOREIGN PATENT DOCUMENTS

| | | |
|---|---|---|
| EP | 1637386 A1 | 3/2006 |
| JP | 2013-220736 A | 10/2013 |

(Continued)

OTHER PUBLICATIONS

Extended European Search Report issued in Application No. 15197738.6 dated Mar. 24, 2017.

*Primary Examiner* — Dennis H Pedder
(74) *Attorney, Agent, or Firm* — McDermott Will & Emery LLP

(57) ABSTRACT

A vehicle having a display apparatus includes a main display part installed at a front surface of a center fascia of the vehicle to display an image, and a center panel that traverses the main display part in a width direction of the main display part, wherein the center panel is provided to move in an upper side and lower side direction so as to adjust a display area of the main display part.

10 Claims, 14 Drawing Sheets

(56) References Cited

U.S. PATENT DOCUMENTS

2014/0350784 A1 11/2014 Imai
2015/0084886 A1 3/2015 Kamiyama et al.

FOREIGN PATENT DOCUMENTS

KR 20-1999-0023924 U 7/1999
WO 2013/157492 A1 10/2013

* cited by examiner

VEHICLE INCLUDING DISPLAY APPARATUS

CROSS-REFERENCE TO RELATED APPLICATION

This application claims the benefit of priority to Korean Patent Application No. 10-2015-0000191, filed on Jan. 2, 2015 with the Korean Intellectual Property Office, the disclosure of which is incorporated herein by reference.

TECHNICAL FIELD

Embodiments of the present disclosure relate to a vehicle including a display apparatus, and more particularly, to a vehicle including a display apparatus that is mounted in a vehicle to display information to a passenger.

BACKGROUND

A vehicle is provided with a display apparatus at a driver seat thereof that can display various pieces of information.

The display apparatus provides various information, such as information about a path to a destination from an origin, and information about the current location of the vehicle. In addition, the display apparatus may playback music or video, receive terrestrial broadcasting signals or satellite broadcasting signals that are then displayed through a screen of the display apparatus, and provide information about the state of the vehicle or information for user convenience, such as weather and news.

The conventional display apparatus for a vehicle is provided with a single display installed at a center fascia thereof. Meanwhile, since various types of information are displayed by the display apparatus, and technologies of inputting information by touching a display part have been developed, a need for a large-scale display arises.

In recent years, a display apparatus having a dual display function has been developed to keep up with such a need. The display apparatus is provided at an upper side of a center fascia with a display part used for navigation, and at a lower side of the center fascia with a display part used for displaying images and music.

However, such a display structure displays designated information on each display part, so there is a limitation in displaying desired information for each state of the vehicle. In addition, the display structure is provided with displays at separated areas, respectively, which causes difficulty in representing information in a large-scaled screen.

Meanwhile, there exists a display apparatus having a large-scaled display part that occupies most of the area of the center fascia. However, when navigation is displayed while driving, the navigation information may be displayed outside of a driver's vision, putting the driver at risk. In addition, the center fascia is low on space for installing other apparatuses except for the display apparatus, which causes difficulty in ensuring a space which is assigned a function having a higher priority (for example, a space in which an emergency lamp switch or an air conditioner switch is installed). In addition, this structure ends up causing a coarse interior, degrading an aesthetic quality of the vehicle.

Accordingly, there is a need for a technology removing the above constraints while displaying various types of information using a large-scaled screen.

SUMMARY OF THE DISCLOSURE

Therefore, it is an aspect of the present disclosure to provide a vehicle including a display apparatus that is capable of applying a large-scaled display part to a center fascia and ensuring flexibility in use in a stop state and in a driving state.

Additional aspects of the disclosure will be set forth in part in the description which follows and, in part, will be obvious from the description, or may be learned by practice of the disclosure.

In accordance with one aspect of the present disclosure, a vehicle having a display apparatus, the display apparatus including a main display part and a center panel. The main display part may be installed at a front surface of a center fascia for the vehicle to display an image. The center panel may traverse the main display part in a width direction of the main display part. The center panel may be provided to move in an upper side and lower side direction so as to adjust a display area of the main display part.

When the center panel moves downward, the main display part may be divided by the center panel into an upper display part and a lower display part.

The center panel may move in an upper side and lower side direction by being guided by rails that are provided at both sides of the main display part.

The vehicle may further include a cluster that is installed on a portion of a dash board in front of a driver seat and an assistant seat display part that is installed on another portion of the dash board in front of an assistant seat, wherein the center panel may move in a upper side and lower side direction by being guided by rails that are provided at the cluster and the assistant seat display part.

The main display part may be installed to move in an upper side and lower side direction with respect to the center fascia.

The center panel may be spaced forward apart from the main display part, and the main display part moved upward may be provided to be further upright than when moved downward.

In a state in which the main display part is moved upward, the main display part may protrude upward of an upper end of the center fascia.

The center panel may be provided to move downward when the main display part moves upward, and the center panel may be provided to move upward when the main display part moves downward.

The center panel may move upward and downward depending on at least one condition from among a motion of the vehicle and a position of a gear.

The center panel may be provided with a display part, and the display part may display a different content depending on a movement of the center panel.

The center panel may be provided with a hard key or a physical key, and the hard key or the physical key may perform a different function depending on a movement of the center panel.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 1 to 3 are diagrams illustrating an interior structure of a vehicle having a display apparatus for a vehicle in accordance with an embodiment of the present disclosure, in which FIG. 1 is a perspective view illustrating a display for a vehicle in a first operation in accordance with an embodiment of the present disclosure, FIG. 2 is a perspective view illustrating a display for a vehicle in a second operation in accordance with an embodiment of the present disclosure, and FIG. 3 is a plan view seen from a driver's seat;

FIGS. 9 and 10 are diagrams illustrating a main display apparatus in operation in accordance with an embodiment of the present disclosure, in which FIG. 9 is a cross sectional view illustrating a main display apparatus in a first operation, and FIG. 10 is a cross sectional view illustrating a main display apparatus in a second operation;

DETAILED DESCRIPTION

Figure 1:
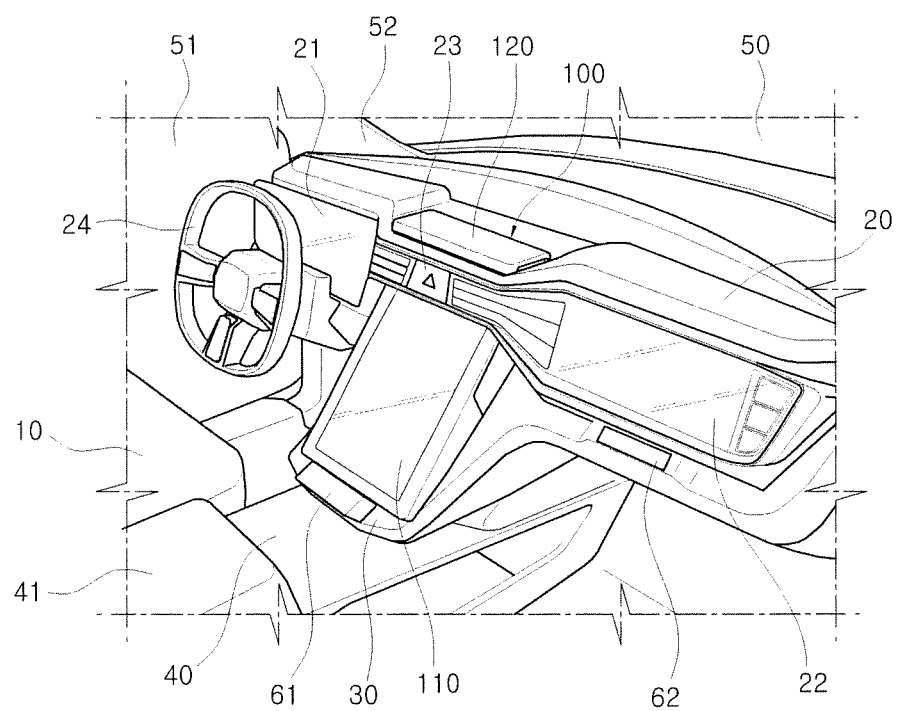

Reference will now be made in detail to the embodiments of the present disclosure, examples of which are illustrated in the accompanying drawings, wherein like reference numerals refer to like elements throughout.

Figure 2:
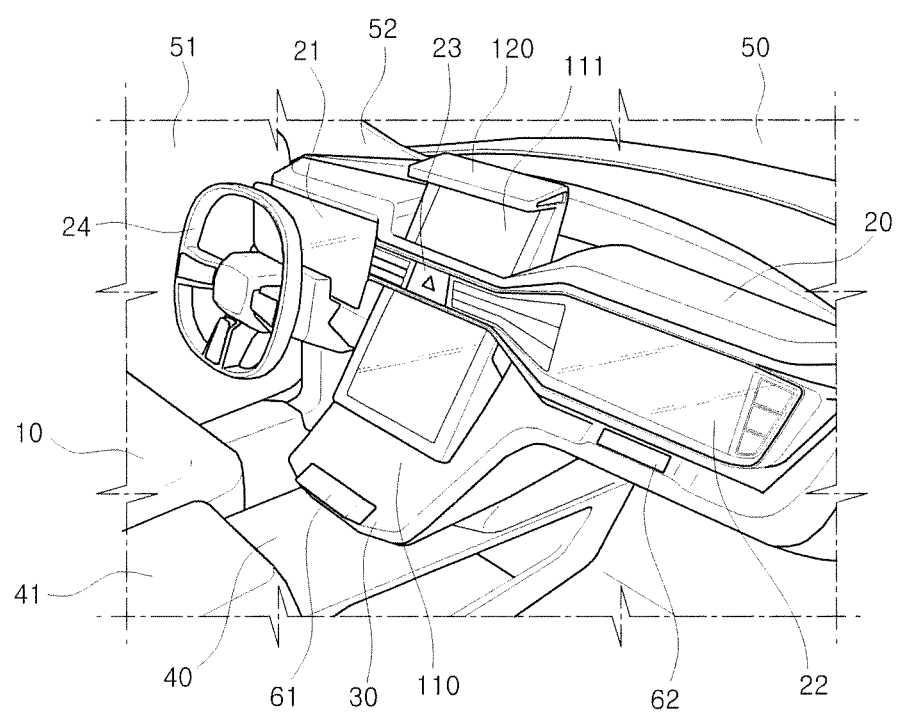
Figure 3:
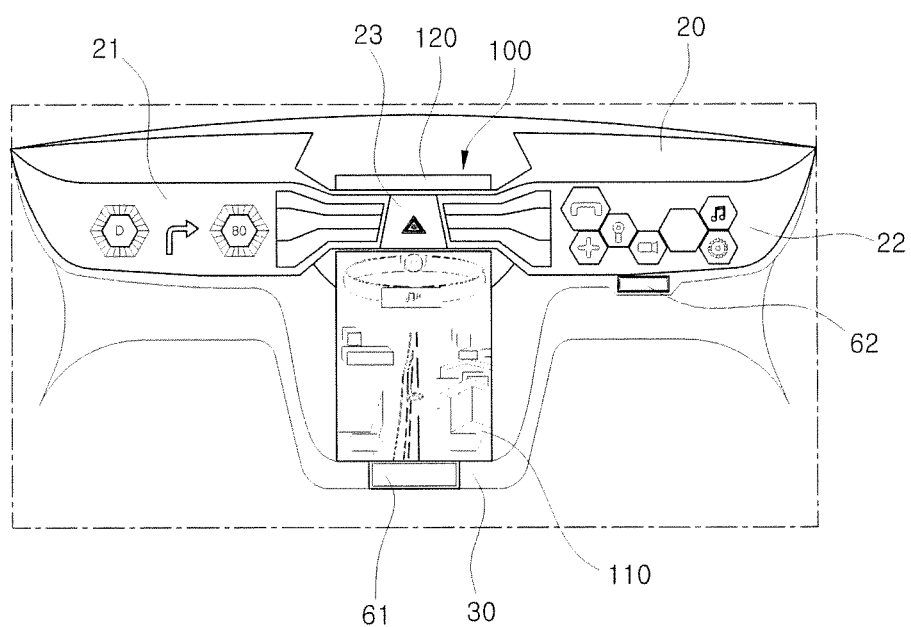
Figure 4:
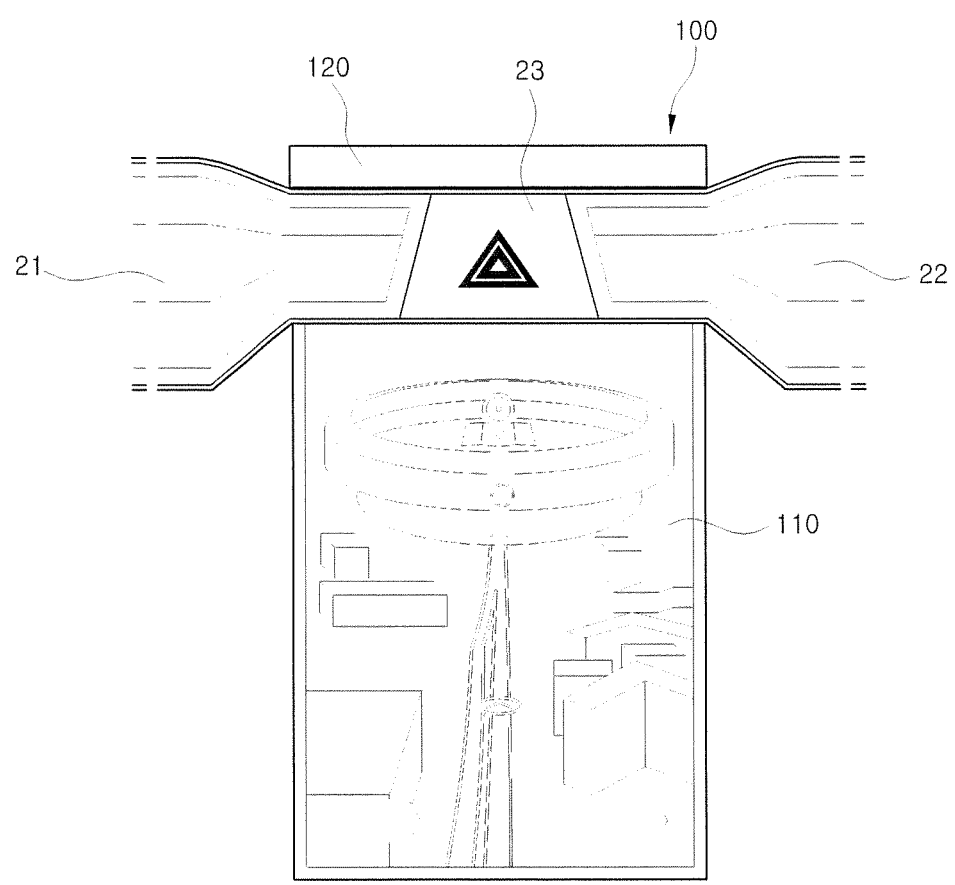
FIG. 4 is a plan view illustrating a main display apparatus in a first operation.
Figure 5:
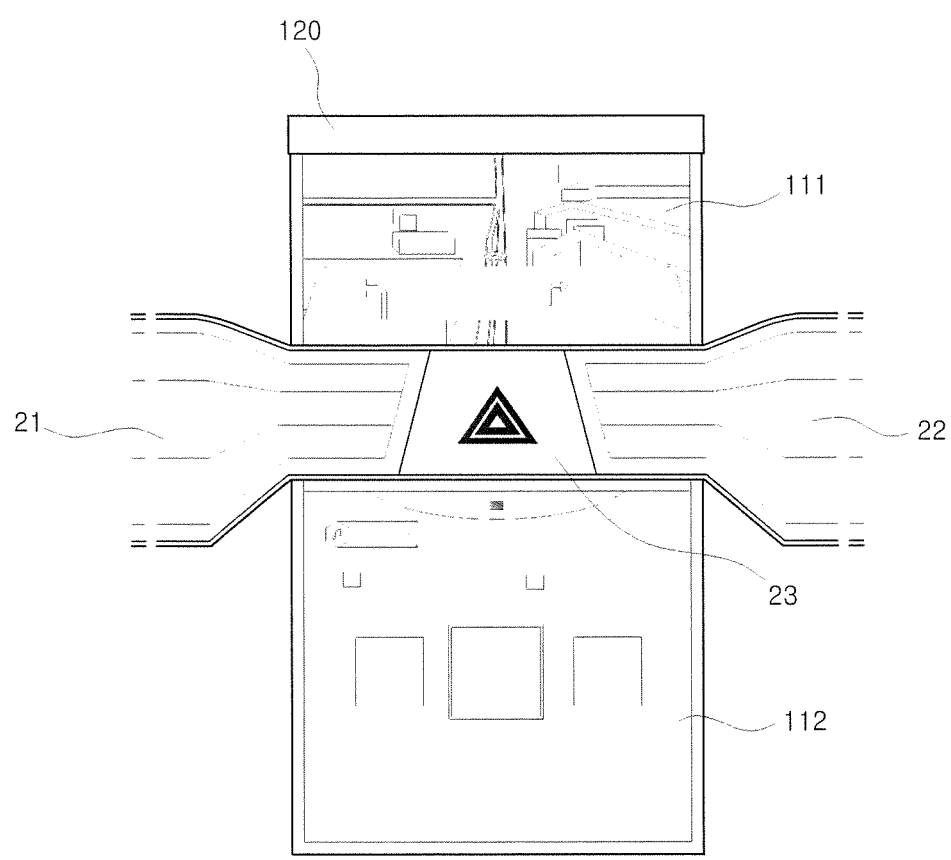
FIG. 5 is a plan view illustrating a main display apparatus in a second operation.

FIGS. 1 to 3 are diagrams illustrating an interior structure of a vehicle having a display apparatus for a vehicle in accordance with an embodiment of the present disclosure, in which FIG. 1 is a perspective view illustrating a display for a vehicle in a first operation in accordance with an embodiment of the present disclosure, FIG. 2 is a perspective view illustrating a display for a vehicle in a second operation in accordance with an embodiment of the present disclosure, FIG. 3 is a plan view seen from a driver's seat, FIG. 4 is a plan view illustrating a main display apparatus in a first operation, and FIG. 5 is a plan view illustrating a main display apparatus in a second operation.

A display apparatus in accordance with an embodiment of the present disclosure may be installed in a vehicle. The following description will be made in relation to a display apparatus installed in a vehicle as an example.

The vehicle represents various apparatuses designed to transport an object, for example, a human, a substance or an animal, from an origin to a destination. The vehicle may include an automobile travelling on a road or a track, a vessel moving on the sea or river, and an aircraft flying through the air.

In addition, the vehicle travelling on a road or a track is moved in a predetermined direction according to rotation of at least one wheel of the vehicle, and the vehicle includes a tri-car, a four-wheel drive car, a construction machine, a two wheeled car, a prime mover apparatus, a bicycle and a train travelling on a track.

Referring to FIGS. 1 and 2, an inner front side of the vehicle is divided into a front window glass 50 provided at a front of the vehicle, a pair of side window glasses 51 provided at sides of the vehicle and a pillar 18 provided between the front window glass 50 and each of the side window glasses 51. Description of an inner rear side of the vehicle will be omitted.

Included at an inside of the vehicle are a seat 10 on which a passenger sits, a dash board 20, a cluster 21 disposed on the dash board 20, a steering wheel 24 manipulating a running direction of the vehicle, a center fascia 30 on which a control panel for an audio apparatus and an air conditioning apparatus are disposed, a gear box 40 positioned between a driver seat and an assistant seat, and an arm rest 41 positioned at a rear of the gear box 40 and on which a driver's arm is placed.

The seat 21 may be a driver's seat on which a driver is seated, an assistant seat on which a fellow passenger is seated and a back seat positioned at an inner rear portion of the vehicle. Meanwhile, depending on the type of a vehicle, the existence of the assistant seat and the back seat, the disposition of the back seats and the number or existence of the back seats may be changed.

The cluster 21 is positioned at a front of the steering wheel 24 so as to be viewed by a driver with a minimum change of a sightline while driving. On the cluster 21, a tachometer, a speedometer, a coolant thermometer, a fuel gauge, a turn signal indicator, a high beam, a warning lamp, a seat belt warning lamp, an odometer, a driving detection recorder, an automatic transmission selection lever indicator, a door open warning lamp, an engine oil pressure warning light and/or a low fuel warning light may be included.

In addition, the cluster 21 is implemented in a digital scheme. Such a digital type cluster displays information about the vehicle and information about a driving state as an image.

The steering wheel 24 is an apparatus configured to control a running direction of the vehicle, and includes a rim grasped by a driver and a spoke connected to a steering apparatus of the vehicle and connecting the rim to a hub of a rotating shaft for steering. According to another embodiment of the present disclosure, the spoke may be provided with various apparatuses, for example, a manipulation button to control an audio apparatus.

The center fascia 25 is positioned at a portion of the dash board 20 between the driver seat and the assistant seat, and is provided with the control panel on which a plurality of buttons are disposed to adjust the audio apparatus, the air conditioning apparatus and a heater of the seats. On the center fascia 25, a vent and a cigar jack may be installed. In addition, the center fascia 25 may be provided with a terminal apparatus configured to receive information from a user and output a result corresponding to the received information, for example, a navigation apparatus. Meanwhile, the audio apparatus and the navigation apparatus may be integrally formed with each other as an audio-video-navigation (AVN) apparatus.

The audio apparatus includes an operation panel provided with a plurality of buttons that perform various functions. The audio apparatus provides a radio mode providing a radio function and a media mode playing an audio file stored in various types of storage media. The buttons formed on the operation panel of the audio apparatus include buttons providing functions related to the radio mode, buttons providing functions related to the media mode, and buttons used for the two modes in common.

The navigation apparatus is an apparatus configured to calculate the current position of the vehicle by receiving position information from satellites through a plurality of global positioning systems (GPSs), display the calculated current position that is map-matched on a map, perform a path search from the calculated current position to a destination according to a predetermined path search algorithm based on destinations received from a user, display the searched path matched on a map, and guide a user to the destination according to the path. The navigation apparatus may be located in the center fascia 25 of the vehicle, or may be supportedly installed on the dash board 20.

The air conditioning apparatus adjusts the temperature, the humidity, and the cleanliness of air inside of the vehicle and the flow of air inside of the vehicle to maintain a pleasant environment in the vehicle. The air conditioning apparatus may be located in the center fascia 25 of the vehicle. In addition, the air conditioning apparatus may include at least one vent to discharge air conditioned air.

The gear box 40 may be provided with operating apparatuses that are manipulated by a driver while driving. In general, the gear box is provided with a transmission lever for a transmission of the vehicle, and input apparatuses for executing various apparatuses of the vehicle, operating a control module of the vehicle, or operating execution of control apparatuses of the vehicle. In this case, the input apparatus may be implemented by various schemes, for example, buttons, a knob or a touch recognition part.

The vehicle includes gesture recognition parts 61 and 62 that recognize a gesture of a user, check an operation command corresponding to the recognized gesture, and output the checked operation command to an electronic apparatus. The gesture recognition parts 61 and 62 are positioned on the center fascia 25 and on a portion of the dash board 20, respectively, but the position of the gesture recognition parts according to the present disclosure is not limited thereto.

Meanwhile, the vehicle may further include a power generation apparatus, a power transmission apparatus, a travelling apparatus, a steering apparatus, a braking apparatus, a suspension apparatus, a gearshift apparatus, a fuel apparatus, and a front left wheel, a front right wheel, a rear left wheel and a rear right wheel.

In addition, the vehicle may further include various safety apparatuses for the safety of a driver and a passenger. The safety apparatuses may include an air bag control apparatus to ensure the safety of a driver and an assistant upon a collision of the vehicle, and an electronic stability control (ESC) for controlling the posture of the vehicle upon acceleration or cornering.

In addition, the vehicle may selectively further include a detector part, such as a proximity sensor, to sense an obstacle or another vehicle existing at a rear side or a lateral side of the vehicle, a rain sensor to sense the rainfall possibility and the rainfall, a temperature sensor to sense the indoor/outdoor temperature, a wheel speed sensor to sense the speeds of a front left wheel, a front right wheel, a rear left wheel and a rear right wheel, an acceleration sensor to sense acceleration, a yaw rate sensor to sense a yaw rate and a gyro sensor to sense the posture or orientation of the vehicle.

The vehicle may include an electronic control unit (ECU) to control operations of a power generation apparatus, a power transmission apparatus, a travelling apparatus, a steering apparatus, a braking apparatus, a suspension apparatus, a gearshift apparatus, a fuel apparatus, various safety apparatuses and various sensors.

In addition, the vehicle may selectively include electronic apparatuses, such as an air conditioning apparatus, a lighting apparatuses, a navigation apparatus, a heater for seats (that is, a hot wire or a resistive wire), a hands-free apparatus, a GPS, an audio apparatus, a Bluetooth apparatus, a rear side camera, a charging apparatus for an external terminal, or a hi-pass apparatus that are installed for the convenience of a driver.

In addition, the vehicle may selectively include electronic apparatuses, such as a sun roof opening/closing apparatus to automatically open and close a sun roof, a door opening/closing apparatus to automatically open and close a door, or a window glass opening/closing apparatus to automatically open and close a window glass.

The vehicle may further include a starting button to input an operation command to a starting motor (not shown). That is, the vehicle operates the starting motor (not shown) when the starting button is turned on, and drives an engine (not shown), which is a power generation apparatus, through the operation of the starting motor.

In addition, the vehicle may further include a navigation apparatus, an audio apparatus, an interior lighting apparatus, a starting motor and a battery (not shown) for supplying electronic apparatuses with a driving power by being electrically connected to the electronic apparatuses. The battery is charged by using an in-vehicle generator or using power from the engine while driving.

The vehicle in accordance with an embodiment of the present disclosure includes the cluster 21 provided at a front of the driver seat 10, an assistant seat display part 22 provided at a front of the assistant seat, a center panel 23 provided between the cluster 21 and the assistant seat display part 22, and a main display part 110 provided on the center fascia 30.

At least one of the cluster 21, the assistant seat display part 22, the center panel 23 and the main display part 110 may include a display panel that represents an image by receiving a digital signal.

In addition, the at least one of the cluster 21, the assistant seat display part 22, the center panel 23 and the main display part 110 may be a touch panel that receives a touch signal of a user while displaying an image. Accordingly, a driver may execute an icon represented on the display apparatus or invoke a menu by touching a screen of the display panel.

In addition, various manipulating apparatuses may be provided around the cluster 21, the assistant seat display part 22, the center panel 23 and the main display part 110. The manipulating apparatus may include a button, a knob, a touch pad or a gesture input sensor. For example, by pressing a button, rotating a knob, inputting a touch signal to a touch pad or inputting a gesture, such as waving a hand, a manipulation signal is input.

The cluster 21 may display items that need to be checked by a driver while driving. In general, a tachometer, a speedometer, a coolant thermometer, a fuel gauge, a turn signal indicator, a high beam or various warning lamps may be displayed on the cluster 21.

In addition, on the cluster 21, a map and navigation may be displayed. For example, a drive path to a destination may be schematically displayed through a direction indication sign, so that a driver is intuitively identified of the path.

Meanwhile, the cluster 21 in accordance with an embodiment of the present disclosure may represent operation information through the display panel, different from the conventional cluster that displays information through an analog display apparatus. For example, a needle and gauge of the tachometer and various warning lamp icons may be displayed by digital signals.

A main display apparatus 100 including the main display part 110 may be an Audio-Video-Navigation (AVN) apparatus. Accordingly, the main display apparatus 100 may display various images, or play music by being connected to a speaker installed in the vehicle, or display driving information through the navigation system.

In addition, the main display apparatus 100 may be a head unit display apparatus. Accordingly, the main display apparatus 100 may control various image apparatuses and audio apparatuses installed in the vehicle in addition to the cluster 21 and the assistant display unit 22.

In addition, the main display apparatus 100 may be connected to the ECU. Accordingly, the main display apparatus checks various types of information related to the state of the vehicle and driving of the vehicle, executes or stops functions of the vehicle, and adjusts various setting values related to driving of the vehicle. For example, the main display apparatus 100 may perform various functions, such as serving to adjust the temperature of inside of the vehicle by executing functions of the air conditioning apparatus, to display an air pressure measured through the air pressure sensor, or to adjust settings of a suspension apparatus.

The assistant seat display part 22 may be located in a portion of the dash board 20 at a front of the assistant seat.

The assistant seat display part 22 may work with the main display part 110. Accordingly, a person seated on the assistant seat may check the same image as the image displayed on the main display part 110 through the assistant seat display part 22, and by manipulating the assistant display part 22, manipulate the main display part 110.

In addition, the assistant seat display part 22 may be provided to display an image different from that displayed on the main display part 110. For example, when the main display part 110 displays a screen in which the air conditioning apparatus is set, the assistant seat display part 22 may display an image or music.

Meanwhile, the assistant seat display part 22 may exchange information with the main display part 110. For example, information about a destination input through the assistant seat display part 22 may be moved to the main display part 110 and displayed. Similarly, the assistant seat display part 22 or the main display part 110 may exchange information with the cluster 21.

The center panel 23 may be provided between the cluster 21 and the assistant seat display part 22. The center panel 23 is installed at a front of the center fascia 30, and is installed to traverse the main display part 110 in a width direction of the main display part 110. In this case, the center panel 23 is installed to block a portion of the main display 110, and in order to minimize the blocked portion of the main display part 110, the center panel 23 may be provided in the form of a band having a small width in a vertical direction.

When seen from a position of a passenger, a screen area of the main display part 110 may be divided by the center panel 23. The division does not mean spatially separating the main display part 110 such that the main display part 110 is provided with a separate display panel, but means a division of the main display part 110 due to blocking by the center panel 23.

The main display part 110 may include an upper display part 111 provided at an upper side of the center panel 23 and a lower display part 112 provided at a lower side of the center panel 23. The upper display part 111 and the lower display part 112 display different images, respectively. For example, when the upper display part 111 displays navigation information, the lower display part 112 may display audio, video or information about settings of a vehicle.

The upper display part 111, which is provided at a position that is closest to a driver's visual field oriented forward while driving, displays information that is required while driving. For example, the upper display part 111 may be provided at a position higher than an upper surface of the dash board 20, and display navigation and various types of information.

The lower display part 112 may have a screen larger than a screen of the upper display part 111. Accordingly, various types of information are displayed on the lower display part 112, compared to the upper display part 111. For example, information about a vehicle, video and audio information, information about a map, and information about a surrounding area of the vehicle may be displayed on the lower display part 112.

Meanwhile, the upper display part 111 and the lower display part may display different screens depending on the state of the vehicle. The state of the vehicle may include a short stop state or a parked state, a stop state and/or a driving state. For example, the upper display part 111 may display information about setting a destination when the vehicle is in a short stop state or a parked state, and display information about a surrounding of the current location of the vehicle when the vehicle is in a stop state, and display information a path guide when the vehicle is in a driving state. In addition, the lower display part 112 displays information about setting the vehicle when the vehicle is in a short stop state or a parked state, and displays information about a surrounding of the current location of the vehicle when the vehicle is in a stop state, and displays information about an air conditioning apparatus and media when the vehicle is in a driving state.

The center panel 23 may include a center display part. The center panel 23 is positioned above the center fascia 30, and protrudes forward of the main display part 110 (toward the driver seat 10, toward a rear of the vehicle), providing a superior visibility. Accordingly, the center panel 23 may display information having a high priority, or may be provided to manipulate a function having a high priority.

The center panel 23 may display information about a function that is frequently used or needs to be used in an emergency situation. For example, the center panel 23 may display information about a clock, an emergency lamp, an air conditioning apparatus or a currently replayed media.

In addition, the center panel 23 may display notification information while driving. For example, Turn by Turn (TbT) changes, contents about a running safety or a warning by navigation may be displayed on the center panel 23.

Referring to FIGS. 4 and 5, the center panel 23 is provided at a center thereof with an emergency lamp. Since the emergency lamp has a high frequency of use both in a stop state and in a driving state, the emergency lamp is disposed on the center of the center panel 23 that ensures superior visibility and easy access. Meanwhile, not shown in the drawings, the emergency lamp provided on the center panel 23 may be implemented as a hard key or a physical key.

In addition, the center panel 23 displays a function that varies depending on a user's setting. In addition, when a plurality of pieces of information are displayed, the position at which the information is displayed may be set to vary.

Figure 6:
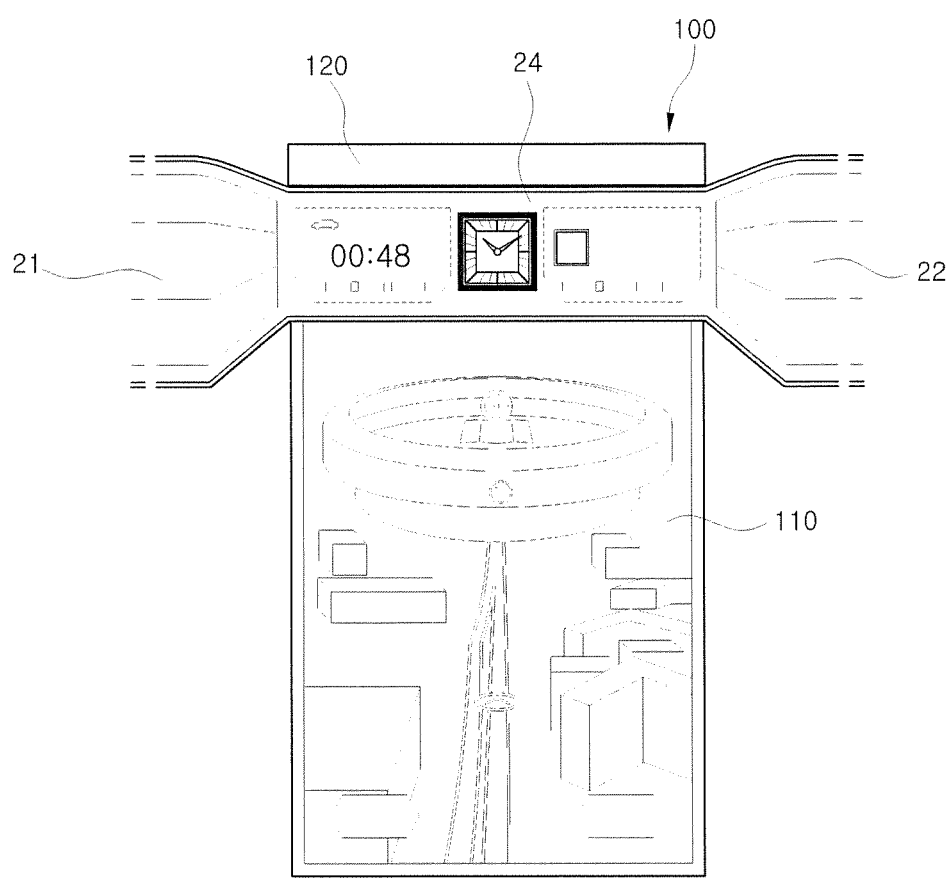
FIG. 6 is a plan view illustrating a screen configuration of a center panel in accordance with another embodiment of the present disclosure.

FIG. 6 is a plan view illustrating a screen configuration of a center panel in accordance with another embodiment of the present disclosure. Referring to FIG. 6, the center panel 23 may display a digital clock, an analog clock and/or media information running. The respective pieces of information may be simultaneously displayed or alternately displayed according to an operation of the user. In addition, the center panel 23 may provide a stop watch function, or may display the temperature of oil or the temperature of cooling water.

Meanwhile, a hard key or a physical key may be installed around the center panel 23. In this case, the center panel 23 may conceptually include an area on which a display panel is provided and a panel connecting the cluster 21 to the assistant seat display part 22.

Meanwhile, the center panel 23 may be formed as transparent. Accordingly, contents displayed on an area of the main display part 110 in which the center panel 23 overlaps the main display part 110 in a front and rear side direction are exposed to a passenger.

In addition, the center panel 23 and the area of the main display part 110, in which the center panel 23 overlaps the main display part 110 in a front and rear side direction, may be provided to display the same contents. Accordingly, the passenger may identify information that is continuously displayed over the upper display part 111, the center panel 23 and the lower display part 112.

Meanwhile, the center panel 23 may be an additional display part disposed between the cluster 21 and the assistant seat display part 22. In addition, the cluster 21 and the center panel 23 may be integrally formed with each other, or the assistant seat display part 22 and the center panel 23 may be integrally formed with each other.

In addition, the cluster 21, the center panel 23 and the assistant seat display part 22 may be integrally formed with each other. In this case, the integral forming may represent that a panel is provided in a unified structure, and respective display parts are provided on the panel, and may represent that a panel is provided in a unified structure and even the respective display parts are integrally formed with each other. When the display parts are integrally formed with each other, the cluster 21, the center panel 23 and the assistant seat display part 22 are distinguished based on the position in which the display parts are provided and the types of information represented by the display parts.

The main display part 110 in accordance with an embodiment of the present disclosure may be provided to be moved in an upper side and lower side direction. For example, the main display part 110 may be slidably coupled to the center fascia 30. In addition, the main display part 110 is coupled to the center fascia 30 through a lift structure, an arm structure or a link structure, so as to be movable in an upper side and lower side direction. In addition, the coupling method of the main display part is not limited thereto, and may be implemented in various methods for performing an up and down movement.

The following description will be made of an embodiment of the present disclosure including the main display part 110 and the center panel 23. However, the present disclosure may include an embodiment in which the center panel 23 is omitted or the center panel does not block the display area of the display part 110.

FIGS. 1, 3 and 4 illustrate a state in which the main display apparatus 100 performs a first operation. In this case, the first operation represents that the main display is moved downward.

In the first operation, the main display part 110 is not divided, and shown below the center panel 23. In this case, the main display part 110 is moved downward such that the main display part 110 has no area blocked by the center panel 23, or such that the main display part 110 is blocked by the center panel 23 but has no area exposed upward of the center panel 23. In the drawings, the main display part 110 is moved downward such that an upper end portion of the main display part 110 is blocked by the center panel 23.

By preventing the main display part 110 from being exposed upward of the center panel 23, the sightline of the passenger is prevented from being dispersed. Depending on situations, a part of an upper portion of the main display part 110 may be exposed upward of the center panel 23 to display some information. For example, the exposed part may provide a warning or a notification to a user by colors or flickering.

In addition, a part of an upper portion of the main display part 110 exposed upward of the center panel 23 may display no information. In this case, the exposed part represents a black screen, which does not disperse the sightline of the passenger.

The first operation state represents a state in which power is turned on but an engine is not started. In addition, the first operation state may represent a state in which the vehicle is in a stop state, for example, the driver puts a gear lever in a neutral position (N), or the drivers operates a brake for a predetermined period of time or above while keeping the gear lever in a driving position (D).

The first operation state requires a low level of attention for a driver to look forward of the vehicle. Accordingly, the first operation state may display detailed information that requires a driver's attention, and may provide a great amount of various types of information. In addition, in the first operation state, the driver has no difficulty in entering information by touching the main display part 110. Accordingly, the first operation may execute various functions that need a driver's input.

For example, in the first operation state, the main display part 110 positioned below the center panel 23 may display information about settings of the vehicle, information about setting various media including audio and video, map information or private information about a user. In addition, the main display part 110 may display information by connecting to the internet or in association with a portable terminal of a passenger.

FIGS. 2 and 5 illustrate a state in which the main display apparatus 100 performs a second operation. In this case, the second operation may represent a state in which the main display part is moved upward.

In the second operation state, the main display part 110 is displayed by being divided by the center panel 23. In this case, a portion of the main display part 110 positioned above the center panel 23 is referred to as the upper display part 111 and a portion of the main display part 110 positioned below the center panel 23 is referred to as the lower display part 112 as described above.

The center panel 23 spatially divides the main display part 110, so that the upper display part 111 and the lower display part 112 display different information from each other. In addition, the upper display part 111 and the lower display part 112 are spaced apart from each other by a height of the center panel 23, thereby having a superior visual effect of separation.

The second operation state represents a state in which the vehicle is while driving, for example, a driver puts a gear lever in a driving position (D), and operates an accelerator. In addition, a driver puts a gear lever in a driving position (D), and operates a brake for a predetermined period of time or below in such a state.

The second operation state requires a high level of attention for a driver to look forward of the vehicle. Accordingly, required information for driving the vehicle is displayed on the upper display part 111. Since the upper display part 111 is disposed at a position which is the closest to the driver's forward sightline, required information is delivered without disturbing a running safety.

The upper display part 111 displays brief information that may be scanned with a glance, and simple and important information. For example, information about driving is displayed on the upper display part 111. For example, the upper display part 111 may display navigation information, or a notification indicator or a warning indicator while driving.

The lower display part 112 requires a line of sight longer than that required for the upper display part 111. However, the lower display part 112 has a screen larger than that of the upper display part 111, and thus the lower display part 112 displays information that may be displayed in the first operation state. In addition, the lower display part 112 may provide a screen in which a driver sets a driving condition or sets an air conditioning apparatus.

In addition, the lower display part 112 may display navigation information displayed on the upper display part 111 with more precision. For example, upon approaching crossroads, a path displayed on the upper display part 111 may be insufficient for delivering precise information to a user. In this case, the lower display part 112 may display an enlarged map of the crossroads and a path for a destination, so that the driver is provided with precise information about the path.

In addition, in the second operation state, the driver may have difficulty in entering information by touching the main display part 110, which may put the driver at risk. Accordingly, the driver may input a signal by using a gesture.

A driver having a medium build may have difficulty in reaching the center fascia 30 while putting his/her back on the back of the seat even by stretching his/her hand. Accordingly, when a touch input is used, in order to manipulate the main display part 110 using a touch input, the driver needs to tilt his/her torso forward while driving. This prevents a running safety. However, if the driver inputs an operation signal by using a gesture, the driver may naturally operate the main display part 10 with his/her back against the back of the seat.

In addition, when a touch input is used, in order to manipulate the main display part 110 using a touch input, the driver needs to gaze at the main display part 110 while driving until a desired icon is touched. This causes the driver to spend a long time without looking forward, thereby reducing running safety. However, if the driver inputs an operation signal by using a gesture, the driver may input signals while looking forward.

A gesture recognition unit 61 for operating the main display part 110 may be provided below the center fascia 30 or at the gear box 40. The position below the center fascia 30 or the position of the gear box 40 corresponds to a position at which a driver is able to input a gesture signal using a natural hand motion while looking forward. Meanwhile, a gesture recognition unit 62 for operating the assistant seat display part 22 may be provided below the assistant seat display part 22.

In addition, the gesture recognition unit 61 for operating the main display part 110 may be provided to be exposed in a state in which the main display part 110 is moved upward, and may be provided to be blocked in a state in which the main display part 110 is moved downward.

In the first operation state, the driver does not need to look forward, so a desired command is sufficiently input only by a touch input. However, in the second operation state, the driver looks forward, so a gesture input is needed. For this reason, the gesture recognition unit 61 is provided to be exposed in a state in which the main display part 110 is moved upward.

Meanwhile, a region of the gesture recognition unit 61, which is exposed when the main display part 110 is moved upward, may be provided to have various functions. For example, the region is provided with an accommodation space, or with a slot to which a mobile device is connected, or a slot into which a memory card, such as an SD card or a media, such as CD, is inserted.

Figure 7:
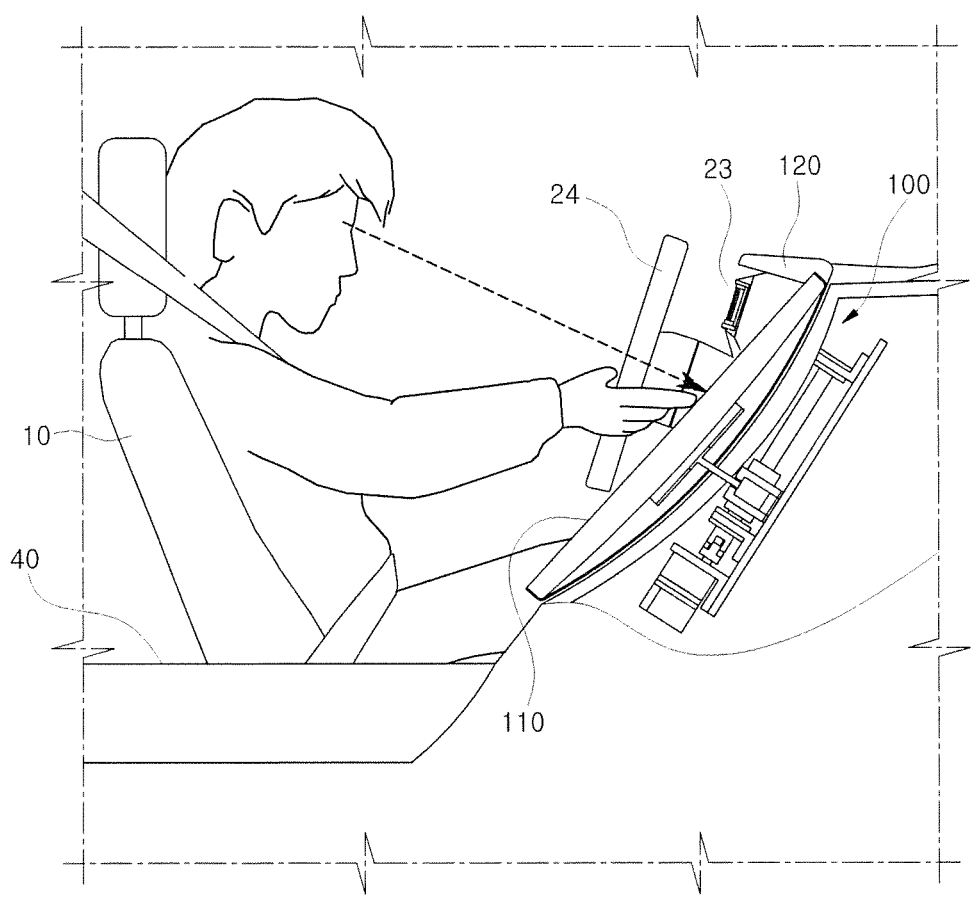
FIG. 7 is a side view illustrating the direction of a driver's sightline and an angular extent of a scene displayed by a display part when a main display apparatus performs a first operation.
Figure 8:
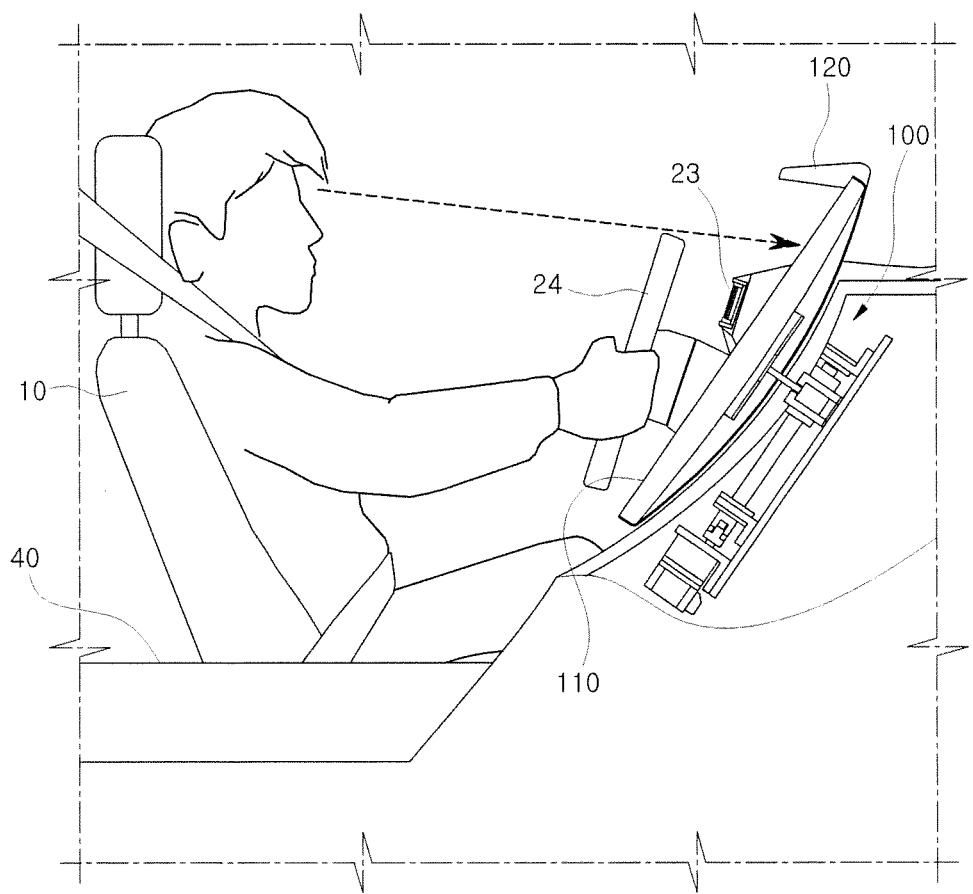
FIG. 8 is a side view illustrating the direction of a driver's sightline and an angular extent of a scene displayed by a display part when the main display apparatus performs a second operation.

Referring to FIGS. 7 and 8, a change in angle of the main display apparatus 100 will be described. FIG. 7 is a side view illustrating a direction of a driver's sightline and an angular extent of a scene displayed by a display part when a main display apparatus performs a first operation, and FIG. 8 is a side view illustrating the direction of a driver's sightline and an angular extent of a scene displayed by a display part when the main display apparatus performs a second operation.

The main display part 110 in accordance with an embodiment of the present disclosure provides a different angle of view between the first operation and the second operation. In particular, an angle of a surface of the main display part 110 with respect to a vertical direction is varied. The angle of view represents an angle formed between a line of sight viewed by a driver and a plane of the main display part 110.

If the angle of view deviates outside a predetermined range, definition and brightness, a visibility may be lowered. Accordingly, the direction of the line of sight of a user and the direction of the plane of the main display part 110 need to be provided to be kept within predetermined allowable range. However, when the direction of the line of sight is perpendicular to the direction of the plane of the main display part 110, light reflected from the main display part 110 causes the visibility to be lowered. Accordingly, the main display part 110 is disposed to have an angle of view within a predetermined range.

The main display part 110 in the second operation state is provided to stand further upright than when in the first operation state. That is, the main display part 110 in the first operation is positioned further tilted down compared to in the second operation state.

In the first operation state, the driver does not need to look forward. Accordingly, the line of sight of the driver tends to be oriented downward. Accordingly, even if the degree of uprightness of the main disport 110 is small, (almost lying down horizontally), the angle of view of the driver does not deviate from the reference range.

However, in the second operation state, the driver, who has been looking forward, shifts the line of sight downward without bowing the driver's head downward to look at the upper display part 111. Accordingly, only when the degree of upright of the main display part 110 is great, the visibility of the upper display part 111 is secured. However, it should be understood that if the upper display part 111 is disposed in a vertical position, the visibility is lowered as described above.

Meanwhile, the first operation state requires a great number of touch inputs performed by the driver. Accordingly, the main display part 110 needs to be disposed at an angle in which the wrist experiences less of a burden. When the main display part 110 is disposed lying down, the wrist has less of a burden. However, the further the main display part 110 is lying down, the further the user's head needs to be bowed, which causes burden on the user's neck. Accordingly, the main display part 110 needs to be disposed at an angle in which both of the neck and the head of the user experience less of a burden.

In addition, when compared to the second operation state, in the first operation state, the main display part 110 is positioned adjacent to the driver, so that a reach zone is easily ensured.

The main display apparatus 100 in accordance with an embodiment of the present disclosure, in a short stop state, in a stop state or in a parked state, is disposed tilted at an angle in which the user performs an easy touch input and a superior visibility is ensured even with the user's neck slightly bowed downward. In addition, the main display part 110 may be tilted to maintain a predetermined angle of view with respect to a direction of forward sightline. That is, the inclination of the main display part 110 may be adjusted according to the condition of the vehicle.

Hereinafter, a structure of the main display apparatus 100 in accordance with an embodiment of the present disclosure is described.

Figure 9:
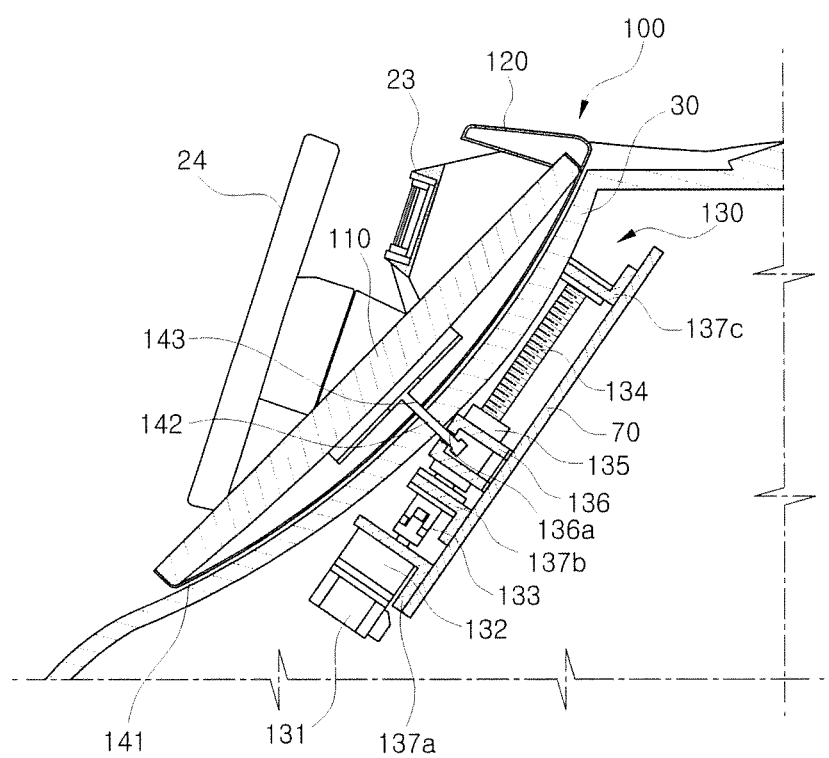
Figure 10:
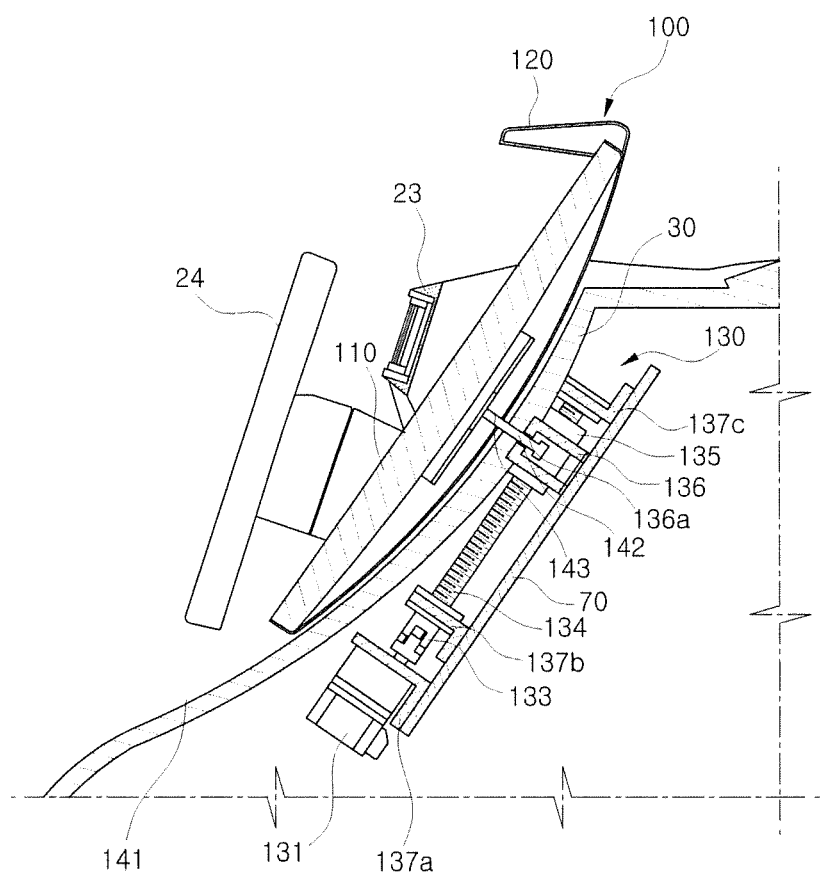
Figure 11:
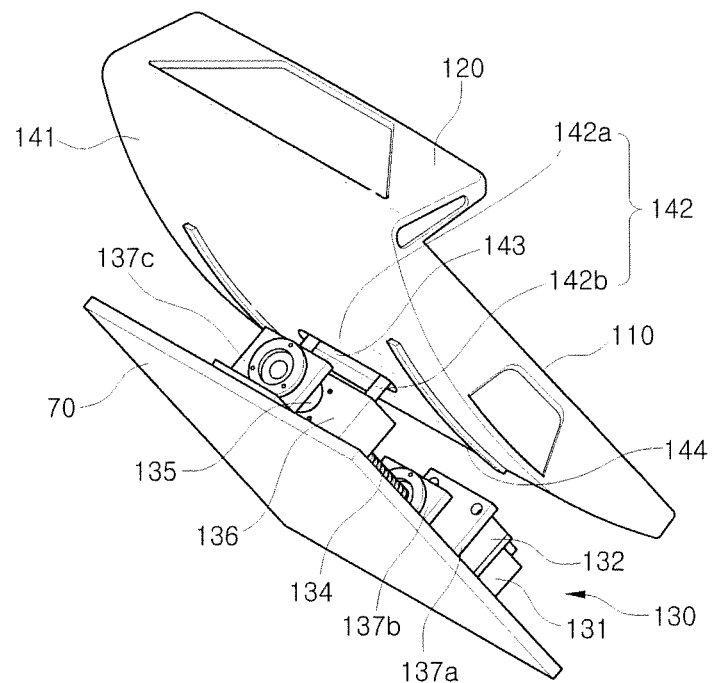
FIG. 11 is a perspective view illustrating a main display apparatus shown from a rear perspective.

FIGS. 9 and 10 are diagrams illustrating a main display apparatus in operation in accordance with an embodiment of the present disclosure, in which FIG. 9 is a cross sectional view illustrating a main display apparatus in a first operation, and FIG. 10 is a cross sectional view illustrating a main display apparatus in a second operation. FIG. 11 is a perspective view illustrating a main display apparatus shown from a rear.

The main display apparatus 100 may include the main display part 110, a housing 141 supporting the main display part 110, a driving part 130 moving the housing in an upper side and lower side direction, and a connection part 142 connecting the housing 141 to the driving part 130.

The main display apparatus 100 is installed on the center fascia 30. Although the main display apparatus 100 is illustrated as including the main display part 110 that is elongated in a height direction on the drawing, the present disclosure is not limited thereto. For example, the main display apparatus 100 may include the main display part 110 that is elongated in a width direction along the shape of the center fascia 30.

The main display part 110 may be provided to perform a touch input while displaying an image. For example, the main display part 110 may include a touch panel.

The main display part 110 is provided to provide a large-scaled screen. Accordingly, a bezel between an edge of the main display part 110 and an edge of the housing 141 is provided to be small. Different from the drawing, a manipulating apparatus, such as a button or a knob, may be provided at a periphery of the main display part 110. Accordingly, a user may input a signal by touching the main display part 110 and also may input a signal by pressing or rotating the manipulating apparatus.

Meanwhile, the main display part 110 is not limited to a large-scaled display, and may be applied to various sized displays. That is, the main display part 110 may be applied to a display of 7 inches or 8 inches in general use.

The housing 141 may be slidably coupled to the center fascia 30. For example, the housing 141 may move up and down while having a rear surface thereof in contact with the surface of the center fascia 30. However, the housing 141 may move up and down while spaced apart from the center fascia 30 by a predetermined distance.

The rear surface of the housing 141 may include a curved surface that bulges. In addition, the center fascia 30 may include a curved surface that is recessed to correspond to the shape of the rear surface of the housing 141. In this case, the curved surface formed on the housing 141 may be provided in an arc shape having a constant curvature.

Since the housing 141 moves along the curved shape surface of the center fascia 30, an angle of the main display part 110 with respect to the upper side and lower side direction (the degree of uprightness) may vary. In the drawings, the main display part 110 is illustrated as having an angle thereof with respect to the vertical direction that deceases as the housing 141 moves upward.

Meanwhile, in the drawings, the main display part 110 is illustrated as having the angle thereof gradually changing, but according to another embodiment of the present disclosure, the angle may be rapidly changed. For example, the main display part 110 having been kept at an angle corresponding to the first operation state while moving upward may be rapidly changed to an angle corresponding to the second operation state, when entering the second operation state. Conversely, the angle of the main display part 110 may be changed to an angle corresponding to the second operation state while the main display apparatus 100 is moving upward, and the main display part 110 keeping the changed angle is moved upward to enter the second operation state.

The driving part 130 operates to move the housing 141 up and down. For example, the driving part 130 may convert a rotational motion to a translation motion.

The driving part 130 may include a motor 131, a rotating shaft 134 rotated by a rotary force of the motor 131, and a nut member 135 moved up and down according to a rotation of the rotating shaft 134.

In addition, the driving part 130 may further include a deceleration part 132 that may adjust a ratio of a rotating speed of the motor 131 and a rotating speed of the rotating shaft 134. For example, as for the motor 131 with a low rotating speed and a great force (a great torque), the deceleration part 132 that has a low deceleration ratio is used to increase the speed of the nut member 135 performing translation. Accordingly, the main display part 110 may be changed between the first operation state and the second operation state in a rapid fashion. Conversely, as for the motor 131 with a high rotating speed and a small force (a small torque), the deceleration part 132 that has a high deceleration ratio is used to increase a force applied to the nut member 135. Accordingly, a force sufficiently great to move the main display part 110 up and down is provided even if the weight of the main display part 110 is increased with the screen is enlarged.

In addition, the user may adjust the moving speed of the main display part 110 by changing the deceleration ratio of the deceleration part 132.

In addition, a coupler 133 may be interposed between the motor 131 or the deceleration part 132 and the rotating shaft 134 of the driving part 130 to transfer a rotation motion. The coupler 133 may be implemented using a generally known product, so a detailed description thereof will be omitted.

The rotating shaft 134 may be coupled to the nut member 135 through a ball screw coupling scheme. That is, a screw thread is formed on an outer surface of the rotating shaft 134, and a screw thread corresponding to the screw thread of the rotating shaft 134 is formed at an inner surface of the nut member 135. In addition, a plurality of balls are interposed between the rotating shaft 134 and the nut member 135 so that friction between the rotating shaft 134 and the nut member 135 is reduced and a force is prevented from being lost while being transmitted. In addition, the nut member 135 is prevented from being rotated, so as to be moved up and down according to rotation of the rotating shaft 134.

In addition, the driving part 130 may be fixed to a fixing panel 70 provided inside the center fascia 30 by a support part 137 including a first support part 137a, a second support part 137b and a third support part 137c. The support part 137(137a, 137b and 137c) may be fixed to the fixing panel 70 at one side thereof, and configured to support the driving part 130 at the other side thereof. For example, the motor 131 and the deceleration part 132 are supported by the first support part 137a, and both ends of the rotating shaft 134 are supported by the second support part 137b and the third support part 137c. In this case, the coupler 133 may be interposed between the first support part 137a and the second support part 137b.

In addition, the driving part 130 may further include a connection block 136 that is coupled to the connection part 142. One side of the connection part 142 is coupled to the housing 141, and the other side of the connection part 142 is coupled to the connection block 136. That is, the housing 141 may be coupled to the driving part 130 via the connection part 142 and the connection block 136, and may be moved according to operation of the driving part 130.

In addition, the connection block 136 is fixed to an outer side of the nut member 135, to prevent the nut member 135 from being rotated. For example, the connection block 136 is integrally fixed to the nut member 135, and has one surface that faces the fixing panel 70. Accordingly, the nut member 135 is prevented from being rotated together with the rotating shaft 134, so that the nut member 135 performs an up and down movement.

Meanwhile, the nut member 135 and the connection block 136 are integrally formed with each other. In addition, the connection part 142 may be coupled to the nut member 135.

Although the rotating shaft 134 and the nut member 135 have been illustrated as being coupled to each other through a ball screw coupling scheme as an example of moving the housing 141 up and down according to operation of the motor 131, the coupling method is not limited thereto. Accordingly, the housing 141 may be moved by using a worm and a worm gear, or using a spline.

The converting of the rotational motion to the up and down motion is illustrated as an example of moving the housing 141 up and down. Accordingly, the housing 141 may be moved in various driving methods, such as using a cylinder or a magnetic force.

Referring to FIG. 11, a guide rail 144 implemented as a protrusion or a groove may be formed on the rear surface of the housing 141. Although not shown, a groove or protrusion corresponding to the guide rail 144 may be formed on one surface of the center fascia 30. The guide rail 144 may guide up and down movement of the housing 141.

Referring to FIGS. 9 and 10, the housing 141 may have a distance thereof with respect to the driving part 130 varied while moving up and down. In addition, the housing 141 may have a direction thereof with respect to the driving part 130 varied while moving up and down. For example, when the rear surface of the housing 141 is provided in an arc shape having a convex curve, an angle formed between a front surface of the main display part 110 and the driving part 130 is changed while the housing 141 moves on the one surface of the center fascia 30.

For example, one side of the connection part 142 is fixed to the housing 141, and the other side of the connection part 142 is provided to be slidable and tiltable with respect to the connection block 136. In addition, the connection part 142 has a length thereof adjustable, and a joint is provided at the connection part 142 so as to perform tilting. In addition, the other side of the connection part 142 is provided to be slidable with respect to the connection block 136, and the one side of the connection part 142 is hingedly coupled to the housing 141.

Figure 12:
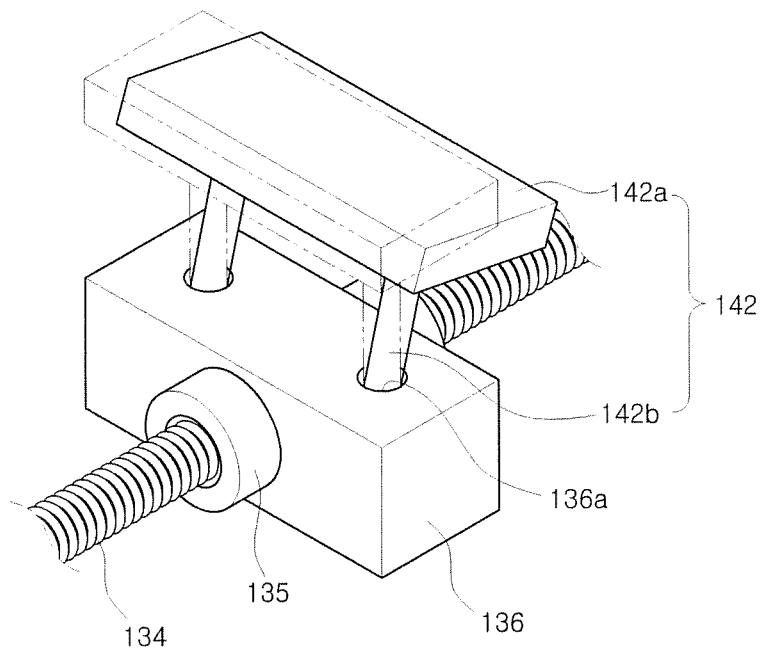
FIG. 12 is a perspective view illustrating a structure in which a housing is tiltably connected.

FIG. 12 is a perspective view illustrating a structure in which the housing 141 is tiltably connected.

Referring to FIGS. 11 and 12, the connection part 142 may include a plate 142a that is coupled to the housing 141 and a plurality of connection bars 142b that are protruded from the plate 142a.

For example, the plate 142a is provided in the form of a panel, and may be supported by being inserted into the housing 141. The plate 142a causes an area coupled to the housing 141 to be enlarged, so that the housing 141 is stably supported. In addition, the plate 142a has a small thickness, so that the main display part 110 is provided in a slim structure.

The connection bar 142b is provided in the form of a cylinder, and provided in a pair. The connection bar 142b may be protruded to the outside of the housing 141 by passing through a connection part insertion hole 143 of the housing 141. In addition, the connection bar 142b may be coupled to the connection block 136 while interposing the nut member 135 therebetween. The connection bar 142b may be inserted into a hole 136a formed through the connection block 136, and provided to be slidable with respect to the connection block 136, allowing a distance between the housing 141 and the driving part 130 to be varied.

In addition, the connection bar 142b is tiltably coupled to the connection block 136. For example, an inner diameter of the hole 136a formed through the connection block 136 is greater than an outer diameter of the connection bar 142b. In addition, the hole 136a formed through the connection block 136 may be formed in an elongation hole.

The main display apparatus 100 may further include a visor 120 that is protruded forward of an upper portion of the main display part 110 (a direction toward the driver seat 10, that is, toward a rear of the vehicle). The visor 120 may be integrally formed with the housing 141, and connected to an upper end of the housing 141. In addition, the visor 120 may be detachably coupled to the housing 141.

Figure 13:
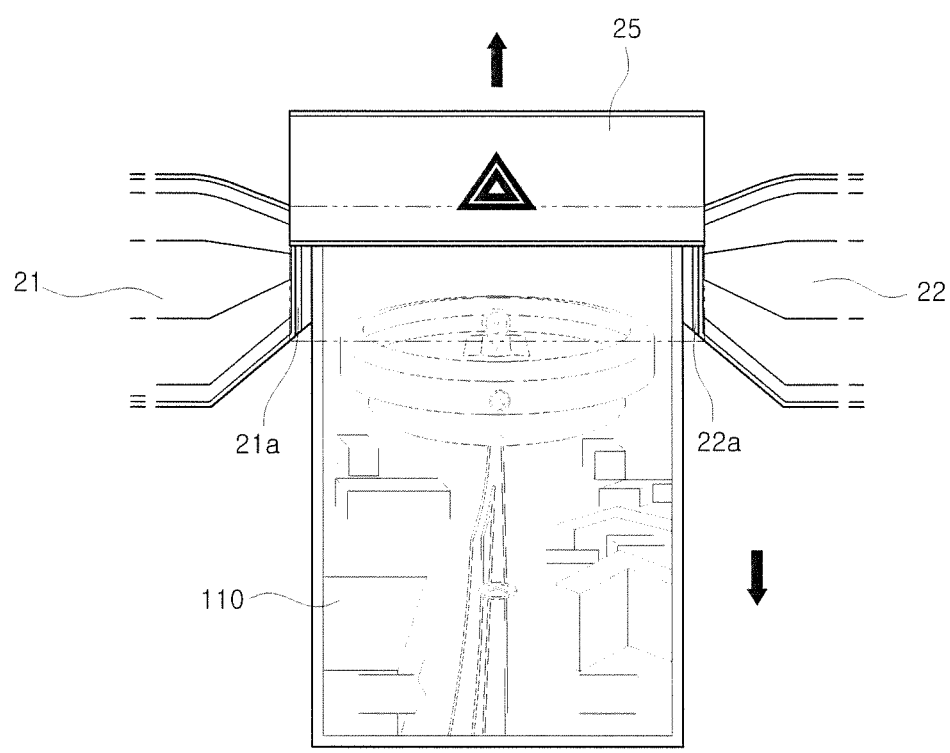
FIG. 13 is a plan view illustrating a display apparatus for a vehicle in a first operation in accordance with another embodiment of the present disclosure.
Figure 14:
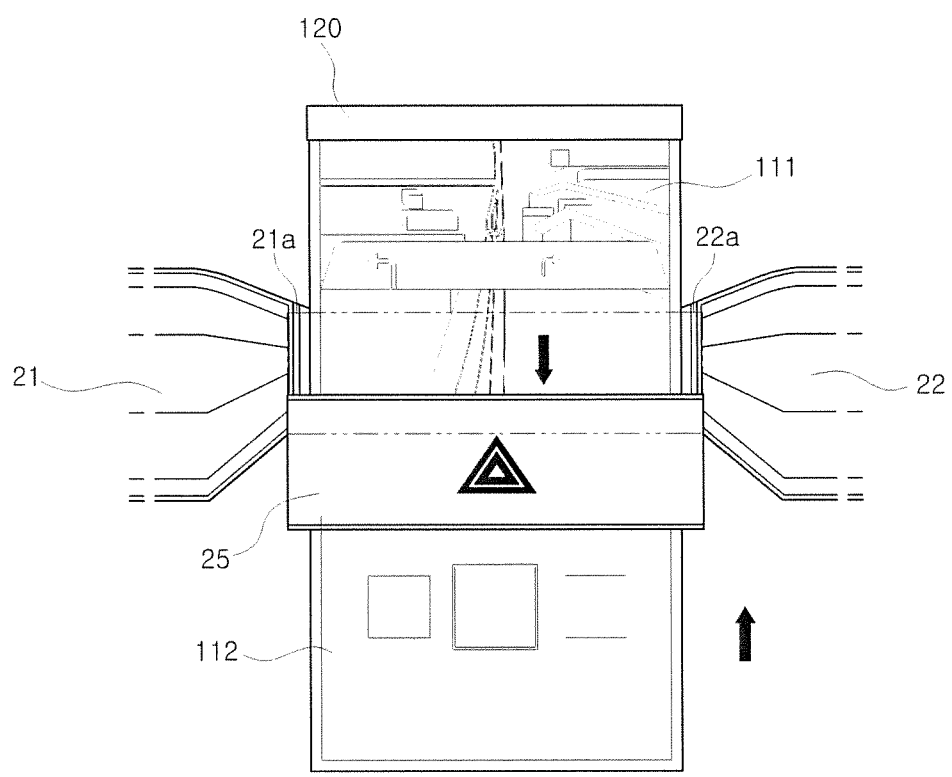
FIG. 14 is a plan view illustrating a display apparatus for a vehicle in a second operation in accordance with another embodiment of the present disclosure.

Referring to FIGS. 13 and 14, a display apparatus accordance with another embodiment of the present disclosure is described. FIG. 13 is a plan view illustrating a display apparatus for a vehicle in the first operation in accordance with another embodiment of the present disclosure, and FIG. 14 is a plan view illustrating a second operation of a display apparatus for a vehicle in the second operation in accordance with another embodiment of the present disclosure.

The center panel 25 in accordance with another embodiment of the present disclosure is provided to move up and down, and the center panel 25 is slidably provided. FIGS. 13 and 14 illustrate operations of the center panel 25 that are provided to move along rails 21a and 22a formed on the cluster 21 and the assistant seat display part 22, respectively. The center panel 25 may be separated from the cluster 21 or the assistant display part 22, and independently installed on the center fascia 30. In this case, the center panel 25 may move up and down along a rail formed on the center fascia 30.

In addition, the center panel 25 may move up and down by using various methods, rather than the sliding method. For example, the center panel 25 may be supported by an arm member or a link member installed on the center fascia 30, and moved up and down according to deformation of the arm member or the link member. In addition, the center panel 25 may adjust a display area of the main display part 110 by being folded or flipped. The method of moving the center panel 25 is not limited thereto, and may be implemented through various structures.

The center panel 25 may be moved according to a motion of moving hands up or down with the hands folded together. In addition, the center panel 25 may be automatically moved according to a driving part such as the motor 131. In addition, the center panel 25 may be manually operated or automatically operated depending on a user's selection.

Referring to FIG. 13, the center panel 25 may be moved upward when the main display apparatus 100 is in the first operation state. The main display part 110 is moved downward and the center panel 25 is moved upward, so that a display area of the main display part 110 exposed downward of the center panel 25 is enlarged.

Referring to FIG. 14, the center panel 25 may be moved downward when the main display apparatus 100 is in the second operation state. The main display part 110 is moved upward and the center panel 25 is moved downward, so that a display area of the main display part 110 exposed upward of the center panel 25, that is, the upper display part 111 is enlarged.

Although the main display part 110 has been illustrated as moving upward or downward depending on whether the vehicle is in a driving state or in a stop state, the present disclosure is not limited thereto. For example, even if the main display part 110 is not moved, the center panel 25 may be moved up and down to adjust the exposed display area of the main display part 110. That is, even in a state in which the main display part 110 is fixed to the center fascia 30, the size of the display area of the main display part 110 or the display area is divided by adjusting the position of the center panel 25 up and down.

For example, the center panel 25 may be moved upward when the vehicle is in a short stop state, a parked stated, or a stop state. Accordingly, the display area of the main display part 110 exposed downward of the center panel 24 may be enlarged.

In addition, the center panel 25 may be moved downward when the vehicle is in a driving state. Accordingly, the display area of the main display part 110 exposed upward of the center panel 25, that is, the upper display part 111 may be enlarged.

Meanwhile, the display apparatus in accordance with another embodiment of the present disclosure may display content on the main display part 110 to be varied according to the operation of the center panel 25. For example, when the center panel 25 is moved upward, the main display part 110 may be set to display entertainment content, such as video or audio. In addition, when the center panel 25 is moved downward, the upper display part 111 may display navigation information and the lower display part 112 may display a screen provided for changing settings of the vehicle, for example, settings of an air conditioning apparatus.

In addition, when the center panel 25 is moved upward and the main display part 110 is divided by the center panel 25, a content displayed on the main display part 110 may be varied according to an operation of the center panel 25. For example, in a state in which the center panel 25 is moved upward, the upper display part 111 is set to replay an audio content. When the center panel 25 is moved downward, the upper display part 111 may be set to display navigation.

The center panel 25 may be provided with a center display part. The center display part may display a content that is varied according to an operation of the center panel 25. For example, the center display part may be set to display media currently playing when the center panel 25 is moved upward, and set to display an emergency lamp and a watch when the center panel 25 is moved downward.

In addition, the center panel 25 may be provided with a hard key or a physical key. The hard key or the physical key may be provided to serve as a feature key. For example, the hard key or the physical key may turn on/off an emergency lamp or operate an air conditioning apparatus.

Meanwhile, the hard key or the physical key provided on the center panel 25 may perform a function that is varied according to an operation of the center panel 25. For example, the hard key or the physical key provided on the center panel 25 may be set to perform a function related to replaying media when the center panel 25 is moved upward. The hard key or the physical key provided on the center panel 25 may be set to perform a function related to turning on/off an emergency lamp or operate an air conditioning apparatus when the center panel 25 is moved downward.

As is apparent from the above, the display apparatus for a vehicle and a vehicle having the display apparatus can provide a large-scaled screen using a display part that is provided at a front surface of a center fascia so as to be movable in an upper side and lower side direction, display different information depending on each state of the display that is distinguished into a driving state and a stop state of the vehicle, and flexibly display desired information at a position that is suitable for easy input or superior visibility depending on the state of the vehicle.

In addition, in a stop state of the vehicle, a large-scaled screen is provided and a reach zone is ensured, facilitating a touch input, and in a driving state of the vehicle, the display part is disposed adjacent to a driver's forward sightline, contributing to a running safety.

In addition, the center panel is provided to traverse sideways the main display part mounted on the center fascia, so that a function or control having a high priority can be displayed.

In addition, by being coupled to the center panel, a single display part is visually distinguished into an upper portion and a lower portion, and each divided portion can display different information, enhancing a convenience of use.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle having a display apparatus, the display apparatus comprising:
    a main display part installed at a front surface of a center fascia of the vehicle to display an image; and
    a center panel that traverses the main display part in a width direction of the main display part,
    wherein the center panel is provided to move in an upper side and lower side direction so as to adjust a display area of the main display part, and
    wherein the center panel is provided with a display part, and the display part displays a different content depending on a movement of the center panel.

2. The vehicle of claim 1, wherein when the center panel moves downward, the main display part is divided by the center panel into an upper display part and a lower display part.

3. The vehicle of claim 1, wherein the center panel moves in the upper side and the lower side direction by being guided by rails that are provided at both sides of the main display part.

4. The vehicle of claim 3, further comprising a cluster installed on a portion of a dash board in front of a driver's seat and an assistant seat display part installed on another portion of the dash board in front of an assistant seat,
   wherein the center panel moves in the upper side and the lower side direction by being guided by rails that are provided at the cluster and the assistant seat display part.

5. The vehicle of claim 1, wherein the main display part is installed to move in an upper side and lower side direction with respect to the center fascia.

6. The vehicle of claim 5, wherein:
   the center panel is spaced forward apart from the main display part, and
   the main display part moved upward is provided to be further upright than when moved downward.

7. The vehicle of claim 5, wherein in a state in which the main display part is moved upward, the main display part protrudes upward of an upper end of the center fascia.

8. The vehicle of claim 5, wherein the center panel is provided to move downward when the main display part moves upward, and
   the center panel is provided to move upward when the main display part moves downward.

9. The vehicle of claim 1, wherein the center panel moves upward and downward depending on at least one condition from among a motion of the vehicle and a position of a gear.

10. The vehicle of claim 1, wherein the center panel is provided with a hard key or a physical key; and
    the hard key or the physical key performs a different function depending on a movement of the center panel.

* * * * *